US008435412B2

(12) United States Patent
Khalaf et al.

(10) Patent No.: US 8,435,412 B2
(45) Date of Patent: May 7, 2013

(54) PROCESS FOR COLOUR NEUTRALIZING COMPOSITIONS

(75) Inventors: Suzanne Khalaf, Brussels (BE); Olga Vladimirovna Pryadilova, Jette (BE); Regine Labeque, Neder over Heembeek (BE)

(73) Assignee: The Procter & Gamble Company, Cincinnati, OH (US)

( * ) Notice: Subject to any disclaimer, the term of this patent is extended or adjusted under 35 U.S.C. 154(b) by 340 days.

(21) Appl. No.: 12/861,101

(22) Filed: Aug. 23, 2010

(65) Prior Publication Data

US 2011/0049424 A1    Mar. 3, 2011

(30) Foreign Application Priority Data

Aug. 27, 2009  (EP) .................................... 09168869

(51) Int. Cl.
*C02F 1/00*     (2006.01)
(52) U.S. Cl.
USPC .......................................... 210/719; 210/727
(58) Field of Classification Search .................. 210/719, 210/727
See application file for complete search history.

(56) References Cited

U.S. PATENT DOCUMENTS

| | | | |
|---|---|---|---|
| 3,900,283 A | | 8/1975 | Hildebrand et al. |
| 5,360,551 A | * | 11/1994 | Weber ........................... 210/719 |
| 2005/0215457 A1 | | 9/2005 | Becks et al. |

FOREIGN PATENT DOCUMENTS

| | | |
|---|---|---|
| EP | 0 618 176 A1 | 10/1994 |
| EP | 0 972 826 A1 | 1/2000 |

OTHER PUBLICATIONS

XP-002569861 dated 1979.*
STIC Search Report dated Sep. 6, 2012.*
XP002569860 Database WPI Section Ch, Week 197915; Thomson Scientific, London, GB; AN 1979-28494B.
XP002569861 Database WPI Section Ch, Week 197808; Thomson Scientific, London, GB; AN 1978-14534A.
International Search Report 7 Pages.

* cited by examiner

*Primary Examiner* — Eisa Elhilo
(74) *Attorney, Agent, or Firm* — Melissa G. Krasovec; Steven W. Miller

(57) ABSTRACT

The present application relates to a process of color neutralizing treatment liquids, wherein the treatment liquid comprises a chromophore selected from the group consisting of monoazo, triarylmethane, xanthene, anthraquinone, hydrophobic dyes, and mixtures thereof, wherein the hydrophobic dyes are selected from the group consisting of benzodifuranes; methine; triphenylmethanes; naphthalimides; pyrazole; naphthoquinone; mono-azo, di-azo dyes and mixtures thereof, said process comprising the steps of:
i. providing a mixing vessel with the treatment composition comprising the chromophore;
ii. providing to the mixing vessel more than 0.045% of a reducing agent selected from the group consisting of sulfite, thiodiurea, formaldehyde bisulfite formaldehyde sulfoxilate and mixtures thereof; and
iii. mixing until discolouration by color neutralization of the chromophore is achieved.

9 Claims, No Drawings

PROCESS FOR COLOUR NEUTRALIZING COMPOSITIONS

TECHNICAL FIELD

The present application relates to a process for colour neutralizing compositions comprising a chromophore.

BACKGROUND TO THE INVENTION

During the manufacturing process of treatment compositions, there are instances when recycling and reblending of the treatment composition is necessary. In particular such is the case, when the finished product does not meet quality criteria. In this situation the failed product is collected and recycled or reblended back into the liquid manufacturing process at a low percent. This reblending process works well unless the product comprises several compositions, especially if one composition comprises an ingredient which is not compatible with the composition into which the recycled product is to be reblended.

This is the case when the composition comprises a strong chromophore, such as for example a hueing dye. Hueing dyes are generally intensely coloured and dark. Recycling such a dye back into the manufacturing process would colour the whole composition. This may in some circumstances be desirable, however in other circumstances there is the desire to reblend the recycled product into a different product, which is not highly coloured. For example, a product may comprise several different compositions, one of which comprises the above described hueing dye. When recycling such a product, the manufacturer could separate each composition and recycle it separately. However this process would be difficult to achieve with accuracy, would be time consuming and expensive. The other alternative would be to combine all the compositions and recycle as one composition. However when one composition comprises a hueing dye, the combined liquid would become intensively coloured and dark. This combined liquid could not be reblended into a non-coloured or pale coloured composition.

The Applicants have thus sought to address this problem. The Applicants have focused on neutralizing chromophores and found that the reducing agents of the present invention can neutralize their colour.

SUMMARY OF THE INVENTION

According to the present invention there is provided a process of colour neutralizing treatment liquids, wherein the treatment liquid comprises a chromophore selected from the group consisting of monoazo, triarylmethane, xanthene, anthraquinone and hydrophobic dyes, wherein the hydrophobic dyes are selected from the group consisting of benzodifuranes; methine; triphenylmethanes; naphthalimides; pyrazole; naphthoquinone; mono-azo, di-azo dyes and mixtures thereof, said process comprising the steps of:

i. providing a mixing vessel with the treatment composition comprising the hydrophobic dye;
ii. providing to the mixing vessel more than 0.045% of a reducing agent selected from the group consisting of sulfite, thiodiurea, formaldehyde bisulfite formaldehyde sulfoxilate and mixtures thereof; and
iii. mixing until discolouration of the hydrophobic dye is achieved.

DETAILED DESCRIPTION OF THE INVENTION

Treatment Composition

The process of the present invention relates to the recycling and reblending of a treatment composition. The treatment composition is preferably in liquid, gel or paste form.

The composition recycled in the process of the present invention may comprise other ingredients selected from a list of standard detergent or fabric treatment ingredients such as surfactant, builders, polymers, solvents, chelants, structurants, bleaching system, enzymes, perfumes, dyes, water and mixtures thereof. Unless specified herein below, an "effective amount" of a particular laundry adjunct is preferably from 0.01%, more preferably from 0.1%, even more preferably from 1% to 50%, more preferably to 40%, even more preferably to 5% by weight of the treatment compositions.

In a preferred embodiment of the present process, the composition comprises a salt of sulfite or bisulfite. The Applicants have found that the decolouration process of the present invention is particularly effective in the presence of sulfite or bisulfite.

Chromophore

Shading of white garments may be done with any colour depending on consumer preference. Blue and Violet are particularly preferred shades. Chromophores of the present invention are selected from the group consisting of monoazo, triarylmethane, xanthene, anthraquinone and hydrophobic dyes and mixtures thereof.

Hydrophobic dyes are defined as organic compounds with a maximum extinction coefficient greater than 1000 L/mol/cm in the wavelength range of 400 to 750 nm and that are uncharged in aqueous solution at a pH in the range from 7 to 11. The hydrophobic dyes are devoid of polar solubilizing groups. In particular the hydrophobic dye preferably does not contain any sulphonic acid, carboxylic acid, or quaternary ammonium groups. Most preferred are dyes comprising an azo, methine, pyrazole napthaquinone, phthalocyanine, triphenylmethane dye chromophore or mixtures thereof. Most preferably the dye comprises an azo chromophore.

Preferred hydrophobic dyes have a peak absorption wavelength of from 550 nm to 650 nm, preferably from 570 nm to 630 nm in water. A combination of dyes may be used which together have the visual effect on the human eye as a single dye having a peak absorption wavelength on polyester of from 550 nm to 650 nm, preferably from 570 nm to 630 nm. Preferably, the chromophore constituent exhibits an emission spectrum value from about 400 nanometers to about 480 nanometers in water. This may be provided for example by mixing a red and green-blue dye to yield a blue or violet shade.

Examples of preferred commercially available colouring agents according to the present invention are selected from the list consisting of triarylmethane blue basic dye; a triarylmethane violet basic dye; a methine blue basic dye; a methane violet basic dye; an anthraquinone blue basic dye; an antraquinone violet basic dye; an azo dye basic blue 16, basic blue 65, basic blue 66, basic blue 67, basic blue 71, basic blue 159, basic violet 19, basic violet 35, basic violet 38, or basic violet 48; oxazine dye basic blue 3, basic blue 75, basic blue 95, basic blue 122, basic blue 124, basic blue 141, or Nile blue A; a xanthene dye basic violet 10; an alkoxylated anthraquinone polymeric colorant; alkoxylated thiophene; triphenyl methane; antraquinones; or a mixture thereof.

Preferably the hydrophobic dye is a methine basic blue dye or a methine basic violet dye. Preferably the hydrophobic dye is an alkoxylated anthraquinone polymeric colorant. Preferably the hydrophobic dye is an alkoxylated triphenylmethane polymeric colorant. Preferably the hydrophobic dye is an alkoxylated thiophene polymeric colorant.

A particularly preferred hydrophobic dye of the present invention may be characterized by the following structure:

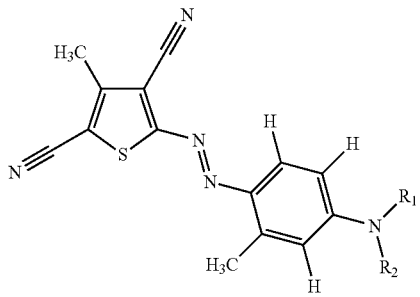

Wherein $R_1$ and $R_2$ can independently be selected from:
a) $[(CH_2CR'HO)_x(CH_2CR''HO)_yH]$
   wherein R' is selected from the group consisting of H, $CH_3$, $CH_2O(CH_2CH_2O)_zH$, and mixtures thereof; wherein R'' is selected from the group consisting of H, $CH_2O(CH_2CH_2O)_zH$, and mixtures thereof; wherein $x+y \leq 5$; wherein $y \geq 1$; and wherein $z=0$ to 5;
b) $R_1$=alkyl, aryl or aryl alkyl and $R_2=[(CH_2CR'HO)_x(CH_2CR''HO)_yH]$
   wherein R' is selected from the group consisting of H, $CH_3$, $CH_2O(CH_2CH_2O)_zH$, and mixtures thereof; wherein R'' is selected from the group consisting of H, $CH_2O(CH_2CH_2O)_zH$, and mixtures thereof; wherein $x+y \leq 10$; wherein $y \geq 1$; and wherein $z=0$ to 5;
c) $R_1=[CH_2CH_2(OR_3)CH_2OR_4]$ and $R_2=[CH_2CH_2(OR_3)CH_2OR_4]$
   wherein $R_3$ is selected from the group consisting of H, $(CH_2CH_2O)_zH$, and mixtures thereof; and wherein $z=0$ to 10;
   wherein $R_4$ is selected from the group consisting of $(C_1$-$C_{16})$alkyl, aryl groups, and mixtures thereof; and
d) wherein R1 and R2 can independently be selected from the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units.

An even more preferred hydrophobic dye of the present invention may be characterized by the following structure:

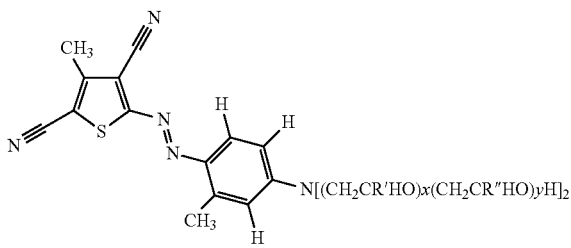

wherein R' is selected from the group consisting of H, $CH_3$, $CH_2O(CH_2CH_2O)_zH$, and mixtures thereof; wherein R'' is selected from the group consisting of H, $CH_2O(CH_2CH_2O)_zH$, and mixtures thereof; wherein $x+y \leq 5$; wherein $y \geq 1$; and wherein $z=0$ to 5.

Preferred mono-azo dyes are of the form:

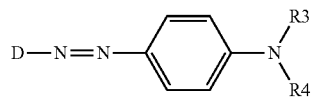

wherein R3 and R4 are optionally substituted $C_2$ to $C_{12}$ alkyl chains having optionally therein ether (—O—) or ester links, the chain being optionally substituted with —Cl, '—Br, —CN, $NO_2$, and —$SO_2CH_3$; and, D denotes an aromatic or heteroaromatic group. Preferably D is selected from the group consisting of: azothiophenes, azobenzothiazoles and azopyridones.

It is preferred that R3 is —CH2CH2R5 and R4 and is —CH2CH2R6 and R5 and R6 are independently selected from the group consisting of: H, —CN, —OH, —$C_6H_5$, —OCOR7 and —COOR7, and that R7 is independently selected from: aryl and alkyl. Preferred aryl are —$C_6H_5$ and C10H7.

The following is an example of a preferred class of mono-azo dyes:

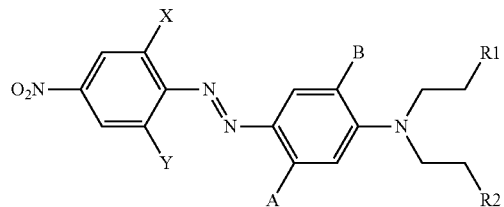

where X and Y axe independently selected from the group consisting of: —H, —Cl, —B, —CN, —$NO_2$, and —$SO_2CH_3$;
A is selected —H, —$CH_3$, —Cl, and —NHCOR;
B is selected —H, —$OCH_3$, —$OC_2H_5$, and —Cl;
$R^1$ and $R^2$ are independently, selected from the group consisting of: —H, —CN, —OH, —OCOR, COOR, -aryl; and
R is C1-C8-alkyl.

The following are preferred azo dyes: Disperse blue 10, 11, 12, 21, 30, 33, 36, 38, 42, 43, 44, 47, 79, 79:1, 79:2, 79:3, 82, 85, 88, 90, 94, 96, 100, 101, 102, 106, 106:1, 121, 122, 124, 125, 128, 130, 133, 137, 138, 139, 142, 146, 148, 149, 165, 165:1, 165:2, 165:3, 171, 173, 174, 175, 177, 183, 187, 189, 193, 194, 200, 201, 202, 206, 207, 209, 210, 211, 212, 219, 220, 224, 225, 248, 252, 253, 254, 255, 256, 257, 258, 259, 260, 264, 265, 266, 267, 268, 269, 270, 278, 279, 281, 283, 284, 285, 286, 287, 290, 291, 294, 295, 301, 304, 313, 315, 316, 317, 319, 321, 322, 324, 328, 330, 333, 335, 336, 337, 338, 339, 340, 341, 342, 343, 344, 345, 346, 351, 352, 353, 355, 356, 358, 360, 366, 367, 368, 369, 371, 373, 374, 375, 376 and 378; Disperse Violet 2, 3, 5, 6, 7, 9, 10, 12, 13, 16, 24, 25, 33, 39, 42, 43, 45, 48, 49, 50, 53, 54, 55, 58, 60, 63, 66, 69, 75, 76, 77, 82, 86, 88, 91, 92, 93, 93:1, 94, 95, 96, 97; 98, 99, 100, 102, 104, 106 or 107; Dianix violet cc; and dyes with CAS-No's 42783-06-2, 210758-04-6, 104366-25-8, 1220.63-39-2, 167940-11-6, 52239-04-0, 105076-77-5, 84425-43-4, and 87606-56-2.

The following are preferred non-azo dyes: Disperse Blue 250, 354, 364, 366, Solvent Violet 8, solvent blue 43, solvent blue 57, Lumogen F Blau 650, and Lumogen F Violet 570.

It is preferred that the dye is fluorescent.

The hydrophobic dye is normally present in the composition in an amount sufficient to provide a tinting effect to fabric washed in a solution containing the treatment composition. In one embodiment, the composition comprises, by weight, from about 0.0001% to about 1%, more preferably from about 0.0001% to about 0.5% by weight of the composition, and even more preferably from about 0.0001% to about 0.3% by weight of the composition. The composition may also comprise between 0.0001 to 0.1 wt % of one or more other dyes selected from cotton substantive shading dyes of group consisting of: hydrolysed reactive dye; acid dye; and direct dye.

Typical dye suppliers may be found in the colour index, and include, Clariant, Dystar, Ciba & BASF.

Reducing Agent

The reducing agent of the present invention is selected from the group consisting of sulfite, thiodiurea, formaldehyde bisulfite, formaldehyde sulfoxilate and mixtures thereof. More preferably, the reducing agent is selected from formaldehyde bisulfite, formaldehyde sulfoxilate and mixtures thereof. The reducing agent is present at a level of greater than 0.045% by weight of the composition. More preferably the reducing agent is present at a level of at least 0.05%, more preferably a level of from at least 1.0%. However the level of reducing agent required to neutralize the chromophore in the composition, is dependant on the level of chromophore in the composition. The more chromophore there is, the greater the amount of reducing agent is required. The speed of the reaction to get to the desired level of discoloration is also dependant on temperature. The more heat applied during the reaction, the less reducing agent is needed and the less time you need to achieve the same discoloration result. The below tables illustrate this phenomenon by comparing data with ambient temperature at 25° C. and 50° C.

Preferred reducing agents are available from BASF under the tradename Rongalite or from StarChem under the tradename Tanapon RFH in north America or Star Clean RFH in Europe.

Formaldehyde Scavenger

The compositions of the present invention preferably comprise a formaldehyde scavenger. Formaldehyde scavengers are preferably selected from the group consisting of urea, ethylene urea, lysine, glycine, serine, carnosine, histidine, 3,4-diaminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, benzotriazol, triazole, indoline, oxamide, sorbitol, glucose, cellulose, poly(vinyl alcohol), partially hydrolyzed poly(vinylformamide), poly(vinyl amine), poly(ethylene imine), poly(oxyalkyleneamine), poly(vinyl alcohol)-co-poly(vinyl amine), poly(4-aminostyrene), poly(1-lysine), chitosan, hexane diol, ethylenediamine-N,N'-bisacetoacetamide, N-(2-ethylhexyl)acetoacetamide, 2-benzoylacetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxformaldehyde, 2,2-dimethyl-1,3-dioxan-4,6-dione, 2-pentanone, dibutyl amine, triethylenetetramine, ammonium hydroxide, benzylamine, hydroxycitronellol, cyclohexanone, 2-butanone, pentane dione, dehydroacetic acid, ammonium hydroxide, alkali or alkali earth metal dithionites, pyrosulfites, sulfites, bisulfite, metasulfite, monoalkyl sulphite, dialkyl sulphite, dialkylene sulphite, sulfides, thiosulfates and thiocyanates (e.g. potassium thiocyanate), mercaptans, such as thioglycolic acid, mercaptoethanol, 4-hydroxy-2-mercapto-6-methylpyrimidine, mercaptothiazoline, thiodialkanoic acids, such as thiodipropionic acid, dithiodialkanoic acids, such as 3,3'-dithiodipropionic acid, sulfinates, such as sodium formaldehydesulfoxylate or formamidinosulfinic acid, thiourea or mixtures thereof. Preferably the formaldehyde scavenger is selected from the group consisting of acetoacetamide, alkali or alkali earth metal sulfite, bisulfite and mixtures thereof. Most preferably the formaldehyde scavenger is selected from the group consisting of sulfite, bisulfite, acetoacetamide and mixtures thereof.

The formaldehyde scavenger according to the present invention is preferably present at a total level of from 0.001% to about 3.0%, more preferably from about 0.01% to about 1%. In a particularly preferred embodiment, the reducing agent, more preferably formaldehyde bisulfite sulfoxilate, and formaldehyde scavenger are present in a ratio of from 3:1 to 1:3, more preferably 2:1 to 1:2, most preferably 1.5:1 to 1:1.5.

Process

The process of the present invention comprises mixing the treatment composition comprising the chromophore and the reducing agent. Any suitable mixing equipment may be used and the process may be batch or continuous.

The process may be carried out at room temperature, however greater speed of reaction and thus process efficiency can be achieved at higher temperatures. In a preferred embodiment the mixing is carried our at greater than 25° C., more preferably greater than 30° C., more preferably greater than 40° C.

Where the composition is comprised within a water-soluble film, i.e. a unit dose pouch product, the process first involves removing the composition from the water-soluble film enclosure. The pouch can be opened using any suitable technique available in the art, including a knife, laser, or vacuum.

The process of the present invention is continued until sufficient discolouration of the composition is achieved. The degree of discoloration can be seen using the Hunter 1948 L, a, b color space measurement. As a composition is dicoloured, the Hunter L values become higher. A higher L value means that the color of the composition is becoming lighter and closer to white, where L is scale showing the trend of color from white to black. The degree of discoloration and thus the reaction time required is dependant on the starting colour and the degree to which colour needs to be removed for recycling purposes.

The Applicant has found a composition with a Hunter L value of 18 or higher is preferred.

EXAMPLES

The present data shows discoloration of a composition comprising 0.25% hydrophobic dye, violet DD hydrophobic dye, available from Miliken, at varying levels of reducing agent, time and temperature. The reducing agent was Star Clean (Tanapon RFH) available from STARCHEM LLC, Wellford, S.C., USA.

To bleach a VDD containing detergent @25° C. "Ambient"

| | Concentration | | | | | | |
|---|---|---|---|---|---|---|---|
| | 1.2% | 1.4% | 1.6% | 1.8% | 2% | 3% | 4% |
| Time | — | — | — | — | 5-16 h | 45 min | 30 min |

To bleach VDD containing detergent @ 50° C. "heated"

| | Concentration | | | | | | |
|---|---|---|---|---|---|---|---|
| | 1.2% | 1.4% | 1.6% | 1.8% | 2% | 3% | 4% |
| Time | 45 min | 30 min | 30 min | 30 min | 30 min | 20 min | 20 min |

The minimal concentration meeting a good level of discoloration and a time of less than 1 hr:
At 25° C., an amount of 3% of Star clean;
At 50° C., an amount of 1.2% of Star clean.

Example 1

After 45 Minutes with a Concentration of Star Clean from 0 to 4%

TABLE 1

L, a, b measures for VDD after 45 min at 25° C.

| | L | a | b |
|---|---|---|---|
| 0% | 1.22 | 3.89 | 0.86 |
| 1% | 1.31 | 4.18 | 0.92 |
| 2% | 3.4 | 10.43 | 2.38 |
| 3% | 19.72 | 12.56 | 13.7 |
| 4% | 19.9 | 11.95 | 13.81 |

Example 2

After 45 Minutes with a Concentration of Star Clean from 0 to 4% at 50° C.

TABLE 2

L, a, b measures for VDD after 45 min at 50° C.

| | L | a | b |
|---|---|---|---|
| 0% | 1.215 | 3.86 | 0.85 |
| 1% | 1.615 | 5.135 | 1.13 |
| 2% | 21.065 | 12.18 | 14.62 |
| 3% | 23.92 | 10.48 | 16.53 |
| 4% | 25.245 | 9.645 | 17.355 |

Example 3

After 2 Hours with a Concentration of Star Clean from 0 to 4%

TABLE 3

L, a, b measures for VDD after 2 h at 50° C.

| | L | a | b |
|---|---|---|---|
| 0% | 1.155 | 3.685 | 0.81 |
| 1% | 1.675 | 5.315 | 1.17 |
| 2% | 21.57 | 12.19 | 14.97 |
| 3% | 26.81 | 9.14 | 18.335 |
| 4% | 26.515 | 9.135 | 18.145 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference, the citation of any document is not to be construed as an admission that it is prior art with respect to the present invention. To the extent that any meaning or definition of a term in this document conflicts with any meaning or definition of the same term in a document incorporated by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process of colour neutralizing treatment liquids, wherein the liquid treatment composition comprises a chromophore comprising monoazo dye selected from the group of:

mono-azo dye having the formula:

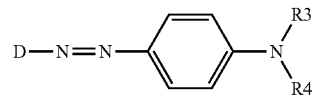

wherein R3 and R4 is selected from substituted C2 to C12 alkyl chains having optionally therein ether (—O—) or ester links, the chain being optionally substituted with —Cl, '—Br, —CN, $NO_2$, and —$SO_2CH_3$; and, D denotes an aromatic or heteroaromatic group;

mono-azo dye having the formula:

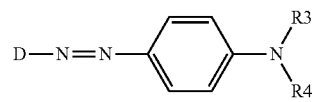

wherein R3 and R4 is selected from substituted C2 to C12 alkyl chains having optionally therein ether (—O—) or ester links, the chain being optionally substituted with —Cl, '—Br, —CN, $NO_2$, and —$SO_2CH_3$; and, D is selected from the group consisting of: azothiophenes, azobenzothiazoles and azopyridones; and mono-azo dye having the formula:

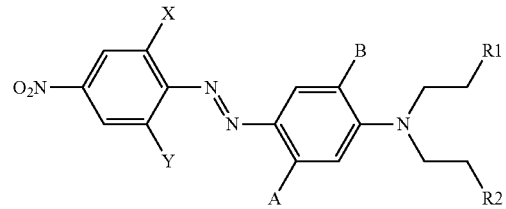

where X and Y are independently selected from the group of: —H; —Cl; —B; —CN; —$NO_2$; and —$SO_2CH_3$; A is selected from the group of: —H; —$CH_3$; —Cl; and —NH- COR; B is selected from the group of: —H; —OCH$_3$; —OC$_2$H$_5$; and —Cl; R$^1$ and R$^2$ are independently, selected from the group of: —H; —CN; —OH; —OCOR; —COOR; -aryl; wherein R is C1-C8-alkyl;

said process comprising the steps of:
i. providing a mixing vessel with the treatment composition comprising the chromophore;
ii. providing to the mixing vessel more than about 0.045% of a reducing agent selected from the group of: sulfite; thiodiurea; formaldehyde bisulfite; formaldehyde sulfoxilate; and mixtures thereof; and
iii. mixing until discoloration by color neutralization of the chromophore is achieved.

2. The process according to claim 1 wherein the mixing vessel is provided with greater than about 0.05% reducing agent.

3. The process according to claim 1 wherein the mixing step (iii) is carried out at a temperature of greater than about 25° C.

4. The process according to claim 1 wherein the reducing agent comprises sulfite or bisulfite salt.

5. The process according to claim 1 wherein the composition comprises a formaldehyde scavenger.

6. The process according to claim 5 wherein the formaldehyde scavenger is selected from the group consisting of sulfite, bisulfite, acetoacetamide and mixtures thereof.

7. The process according to claim 5 wherein the reducing agent and formaldehyde scavenger are present in a ratio of from 3:1 to 1:3.

8. The process according to claim 1 wherein the composition is contained within a water-soluble pouch and the process further comprises the initial step of opening the pouch.

9. The process according to claim 7, wherein the reducing agent is selected from the group of formaldehyde bisulfate, formaldehyde sulfoxilate, and mixtures thereof.

* * * * *